United States Patent
Schaeffer

(10) Patent No.: US 9,352,831 B2
(45) Date of Patent: May 31, 2016

(54) VARIABLE LOWER LIMIT COLLECTIVE GOVERNOR TO IMPROVE RECOVERY

(71) Applicant: Joseph M. Schaeffer, Cedar Hill, TX (US)

(72) Inventor: Joseph M. Schaeffer, Cedar Hill, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 585 days.

(21) Appl. No.: 13/889,454

(22) Filed: May 8, 2013

(65) Prior Publication Data

US 2014/0332621 A1 Nov. 13, 2014

(51) Int. Cl.
*G01C 23/00* (2006.01)
*B64C 27/57* (2006.01)
*G05D 1/08* (2006.01)

(52) U.S. Cl.
CPC ...................................... *B64C 27/57* (2013.01)

(58) Field of Classification Search
USPC .......... 701/3, 14, 16; 340/945, 971; 244/75.1, 244/76 R, 17.13
See application file for complete search history.

(56) References Cited

U.S. PATENT DOCUMENTS 4,355,358 A 10/1982 Clelford
5,246,188 A * 9/1993 Koutsoupidis ................ 244/7 R
8,195,346 B1 * 6/2012 Duerksen et al. ............... 701/15
2012/0153074 A1 6/2012 Nannoni
2012/0286088 A1 11/2012 Mercer

FOREIGN PATENT DOCUMENTS

GB 2192163 A 1/1988
WO 0189926 A2 11/2001

OTHER PUBLICATIONS

Office Action dated Dec. 9, 2014 from counterpart EP App. No. 13193548.8.
Examination report in related European patent application No. 13193548.8, mailed Jan. 24, 2014, 6 pages.
Search report in related European patent application No. 13193548.8, mailed Dec. 20, 2013, 4 pages.
Office Action dated May 1, 2015 from counterpart CA App. No. 2,846,150.

* cited by examiner

*Primary Examiner* — Yonel Beaulieu
(74) *Attorney, Agent, or Firm* — James E. Walton

(57) ABSTRACT

A flight control system uses a governor configured to regulate the speed of a rotor in the aircraft through collective pitch control of a rotor blade, and a limiter configured to selectively remove the threshold limit of the governor when the collective pitch control exceeds a threshold limit, so as to permit a pilot full command of the collective above the threshold limit. The threshold limit is selectively removed and phased back in to provide temporary pilot control to "cushion" landing of an aircraft when an engine has failed.

17 Claims, 4 Drawing Sheets

VARIABLE LOWER LIMIT COLLECTIVE GOVERNOR TO IMPROVE RECOVERY

BACKGROUND

1. Field of the Invention

The present application relates generally to rotor speed governing via collective pitch control and, more particularly, to a rotor speed governing modification for flights with one or more engines inoperative.

2. Description of Related Art

Rotorcraft, and particularly tiltrotor aircraft, generally use beta governing (collective pitch) to control rotor speed. Generally, if rotor speed decreases, the governor will reduce blade pitch in order to match power available from the engine. During a vertical landing after an engine failure, a pilot typically increases the power lever (increasing blade pitch) in order to reduce the sink rate of the aircraft. Due to an engine failure and the resultant reduced power available, the typical beta governor will attempt to maintain rotor speed by rapidly removing the collective pitch as commanded from the pilot. This thereby decreases the thrust and degrades the ability of the pilot to cushion a landing. Typically aircraft utilize governors that limit the blade pitch angle resulting in a pilot's inability to control the sink rate of an aircraft.

Although great strides have been made in governing rotor speed and pitch control, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1A:
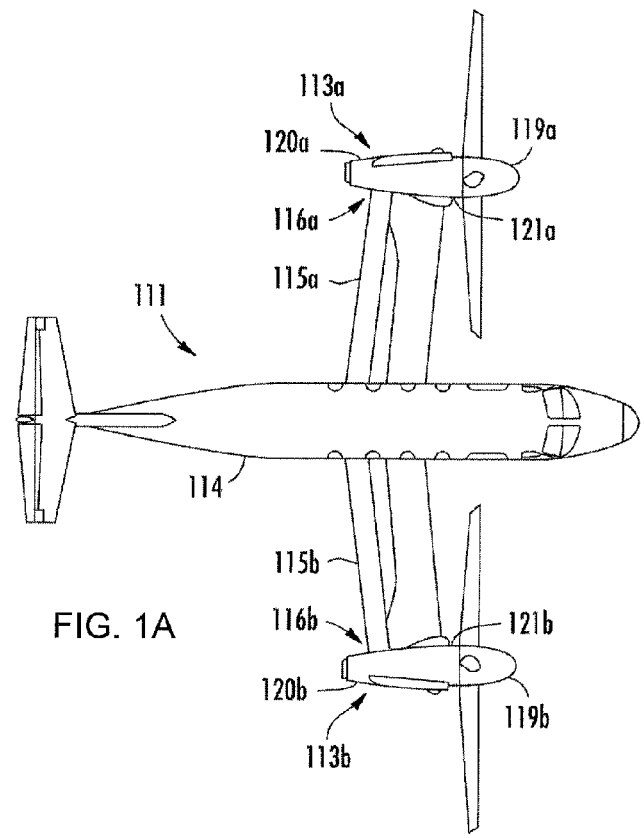
FIG. 1A is a plan view of a tilt rotor aircraft, according to the present application in an airplane mode.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1B:
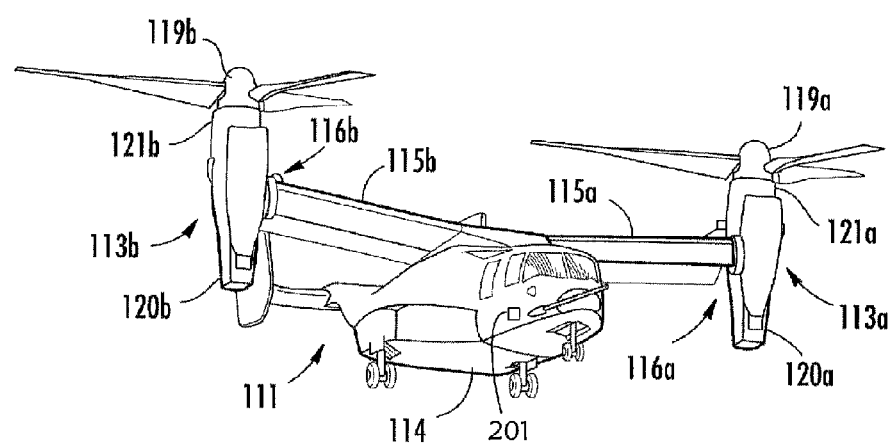
FIG. 1B is a perspective view of the tilt rotor aircraft of FIG. 1A having a flight control system according to the present application, the tilt rotor in a helicopter mode.

Referring to FIGS. 1A and 1B in the drawings, a tilt rotor aircraft 111 according to the present application is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft. In FIG. 1A, tilt rotor aircraft 111 is shown in the airplane mode; and in FIG. 1B, tilt rotor aircraft 111 is shown in the helicopter mode. As shown in FIGS. 1A and 1B, wings 115a and 115b are coupled to a fuselage 114.

Flight control system 201 of the present application is illustrated in FIG. 1B. The specific location may vary with respect to aircraft 111. Additionally, although described with respect to tilt rotor aircraft 111, it is understood that system 201 may be utilized with any aircraft having a plurality of engines, including but not limited to conventional helicopters.

Figure 2:
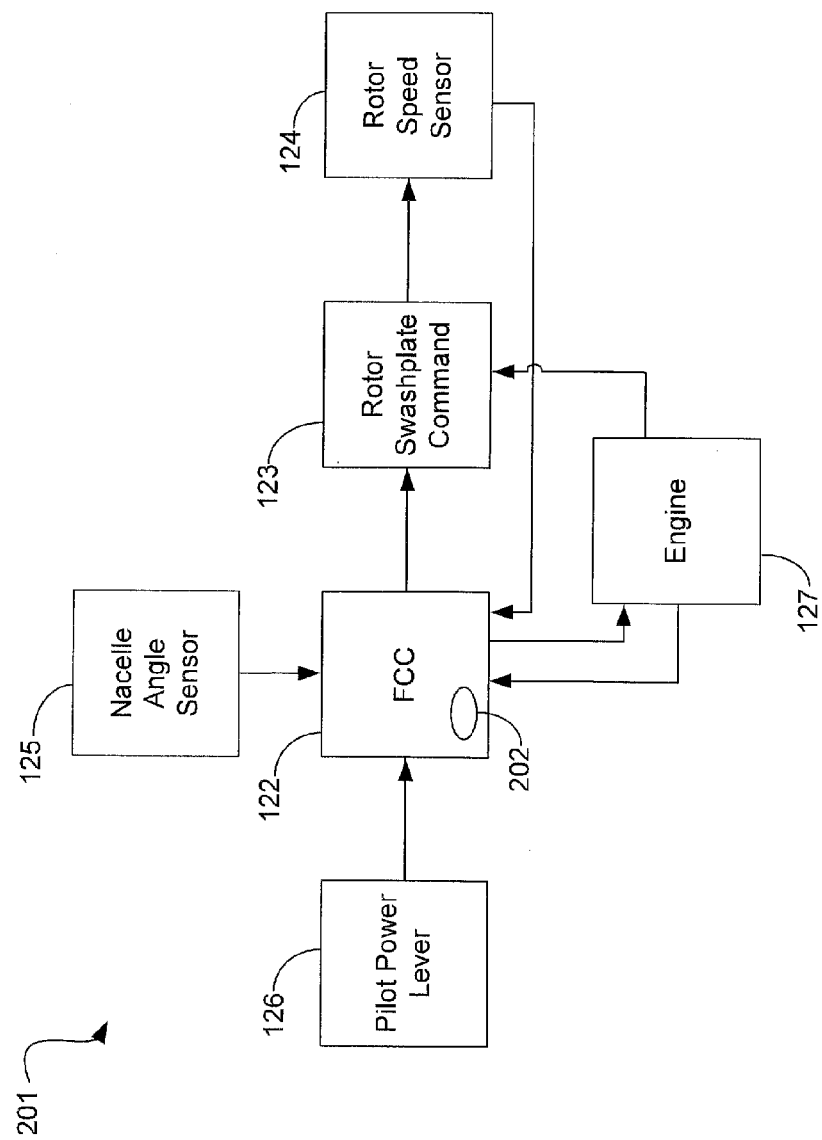
FIG. 2 is a schematic of the flight control system of FIGS. 1A-1B in communication with a plurality of sensors and devices.

Referring now also to FIG. 2 in the drawings, tilt rotor aircraft 111 includes a flight control system 201 according to the present application. Flight control system 201 includes a flight control computer 122 utilizing a control system 202 to produce a total symmetric collective pitch command for controlling blade pitch angles. Control system 202 combines data collected within flight control computer 122, data from a power lever 126, a nacelle schedule transmitted through a nacelle angle sensor 125, and the rotor speed through a rotor speed sensor 124. The total symmetric collective pitch command is communicated to a rotor swashplate command for activation and control of the swashplate and corresponding pitch angles of rotor blades. Other factors incorporated within flight control system 201 are the state of engines 127 and power level rate.

A pilot operating aircraft 111 utilizes a collective or power lever 126 to adjust the pitch angle of the rotor blades. By adjusting the pitch angle of all blades concurrently, a pilot is able to introduce varied amounts of lift which can cause aircraft 111 to become airborne or vary the rate of descent of aircraft 111. The pitch angle of the rotor blades work in combination with engines 127 to maintain a consistent rotor speed. As sufficient power is generated through engines 127, a pilot is permitted relative access to use a wide range of rotor blade pitch angles. However, as engine power is limited, excessive or increased pitch angle may produce too much drag on engines 127, thereby causing rotor speed to decrease.

For example, in multi-engine aircraft, such as aircraft 111, one or more engines 127 may become inoperative or fail. Failure of an engine occurs when the engine fails to respond as directed and is not producing a power output in line with design specifications under designated conditions. When engine failure occurs in a dual engine aircraft, a single engine is left to provide sufficient lift for the aircraft.

Flight control system 201 is configured to selectively restrict and grant a pilot full control of the collective during operation of aircraft 111. During single engine operative conditions, flight control system 201 is configured to permit full control of the collective to the pilot when power lever 126 commands a pitch angle that exceeds a prescribed threshold limit. It is important to keep in mind that the remaining operative engine may be cross-linked to drive the rotor of a failed engine in some configurations. Others configurations of aircraft isolate each engine separately. Aircraft 111 may be configured to cross-link engines together or to maintain isolated engines.

Flight control system 201 provides command data to engine 127 to regulate the amount of power produced and the speed of the rotors. Feedback is received from engine 127 concerning parameters, such as engine performance and engine operability. Flight control system 201 receives feedback concerning the rotor speed from rotor speed sensor 124. Nacelle angle sensor 125 provides data to flight control system 201 concerning the relative orientation of nacelles 120a, 120b. It is understood that flight control system 201 is not limited to such parameters and data from sensors 124, 125 and engines 127 in determining when to grant full control authority to the pilot.

Figure 3:
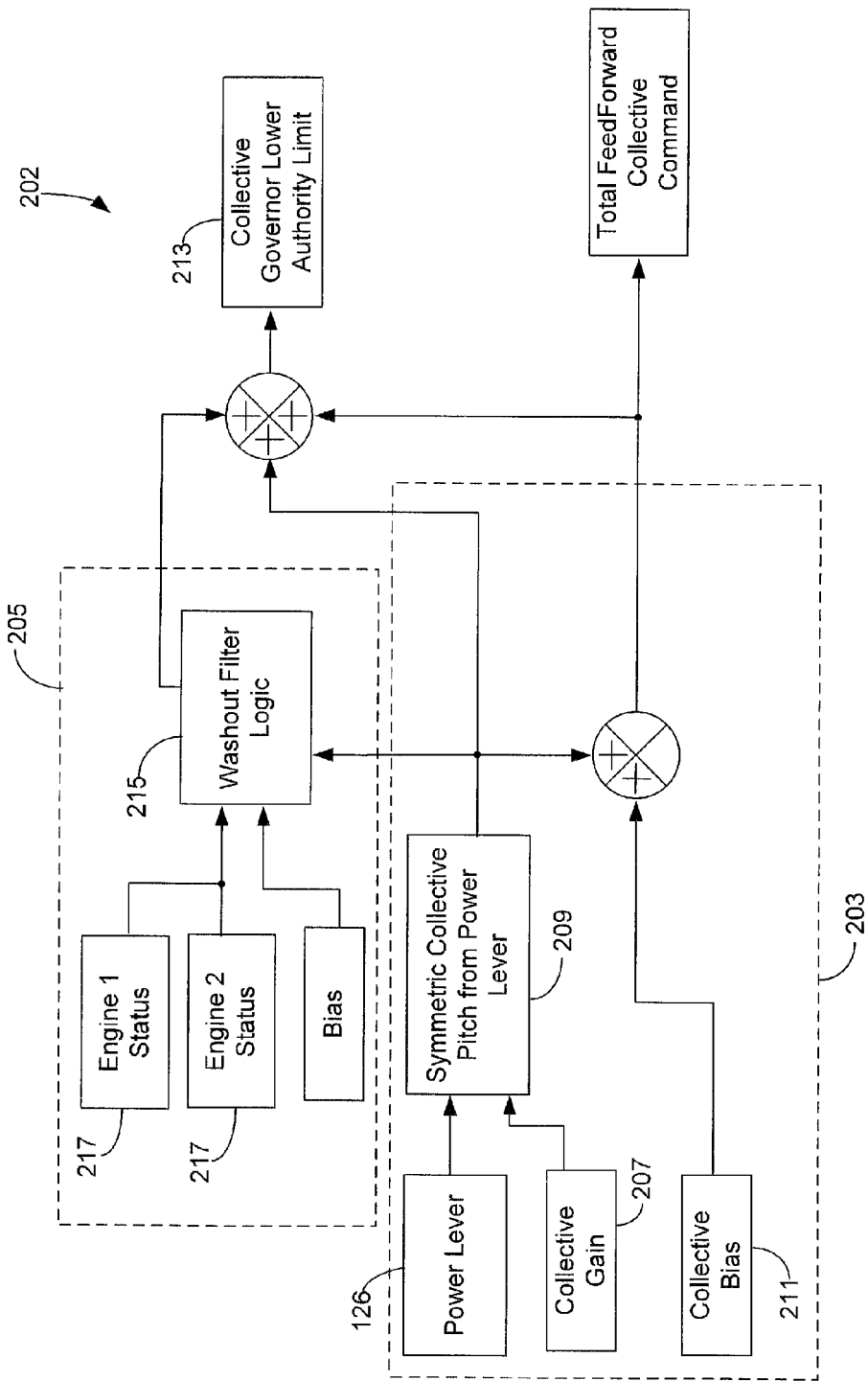
FIG. 3 is a schematic of a control system used in the flight control system of FIG. 2.

Referring now also to FIG. 3 in the drawings, control system 202 is illustrated. Control system 202 includes governor 203 configured to regulate the speed of a rotor in aircraft 111 through collective pitch control of a rotor blade. Governor 203 has a threshold limit relating to the maximum pitch angle of the rotor blade. Control system 202 also includes a limiter 205 configured to selectively activate and cancel or remove the threshold limit from governor 203, so as to permit the pilot full control of the collective above the threshold limit.

Governor 203 has a threshold limit which relates to the maximum pitch angle of the rotor blade. The threshold limit may be selectively operable at various times during flight. For example, the threshold limit may be continuously active while engines are producing power. It is also understood that control system 202 may use a threshold limit that is selectively activated under specific conditions and/or during specific maneuvers (one engine operative for example).

Governor 203 receives communication data at least from power lever 126 and collective gain 207 to produce a symmetric collective pitch 209. Collective pitch 209 is combined with data relating to collective bias 211 to produce a collective governor lower authority limit 213. Limit 213 is used with the nacelle schedule and other components 127, 124, 125 to produce the total symmetric collective pitch command from the flight control computer 122 to control rotor swashplate command 123.

When all engines are operating properly, governor 203 produces a symmetric collective pitch 209 independent of limiter 205. Parameters within governor 203 operate as indicated, which may include use of a threshold limit or may not include the use of a threshold limit. Use of a threshold limit may be based on design characteristics and flight conditions. Flight control system 201 operates within the bounds as designed, such that threshold limit prevents blade pitch above designated levels under selected conditions.

Control system 202 further includes limiter 205 configured to selectively cancel and/or remove the threshold limit of governor 203 so as to permit a pilot full command of the collective above the threshold limit. Limiter 203 is in communication with governor 203. Limiter 203 provides a signal that is combined with symmetric collective pitch 209 to generate limit 213. If none of the engines have failed, limiter 205 is deactivated and produces a baseline lower limit value. This lower limit value deactivates washout filter logic 215, thereby permitting threshold limit of governor 203 to limit control of the blade pitch angle.

Limiter 205 is in communication with engines 127 and alerted concerning the status 217 of engines 127, namely if any engine has failed (loss of power). If an engine has failed, limiter 205 is activated. Upon activation, governor 203 selectively communicates symmetric collective pitch 209 command data to washout filter logic 215 in limiter 205. Communication of command data from symmetric collective pitch 209 to limiter 203 occurs when power lever 126 commands a blade pitch angle greater than the threshold limit of governor 203. Limiter 205 receives command data from collective pitch 209 and processes the command data through logic 215 to generate limiter command data. The command data from logic 215 is dependent upon symmetric collective pitch 209. Functions used within logic 215 increase at higher collective positions. These functions activate anticipation through limiter 203. When active, limiter 205 temporarily increases the baseline lower limit value, such that when summed with symmetric collective pitch 209, the threshold limit of governor 203 is temporarily set to zero and allows the pilot full command of the collective. Limiter 205 is configured to increase the baseline lower limit value for a selected duration of time. The threshold limit of governor 203 is phased back into operation upon the expiration of the time limit.

By maintaining and utilizing a control system 202 as described in the application, an aircraft is capable of decreasing the rate of descent (increased ability to arrest the rate of descent) of aircraft 111 under one engine operative conditions. Flight control system 201 grants the pilot the temporary ability to command increased blade pitch angles to soften touchdown after an engine failure. Flight control system 201 revises the relationship between pilot input through power lever 126 and collective pitch in a collective governing system. This relationship is designed to improve the ability of the pilot to decrease the sink rate after an engine failure in order to "cushion" the landing. Additionally, the relationship is defined such that after an engine failure, the pilot will temporarily override governor 203 and have direct control over the collective. Furthermore, control system 202 phases out the pilots command and phases in the threshold limit of governor 203 in order to return rotor speed to the commanded and limited value.

Figure 4:
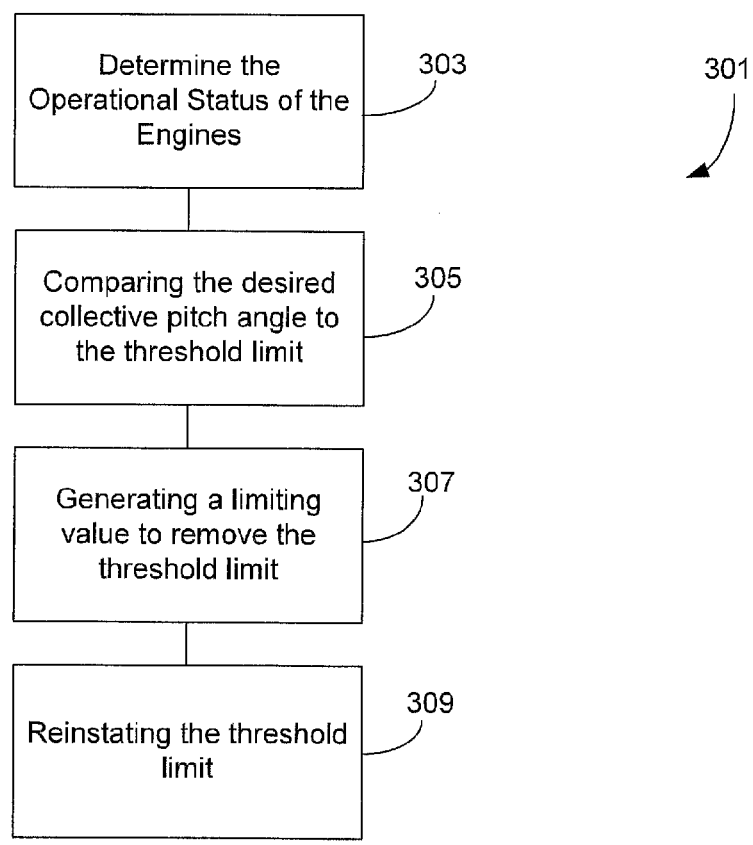
FIG. 4 is a flowchart of a method of operation of the flight control system of FIG. 2.

Referring now also to FIG. 4 in the drawings, a flowchart illustrating the method of operation 301 of flight control system 202 is depicted. Flight control system 201 determines the operational status 303 of the engines. Control system 202, in flight control system 201, compares 305 the desired collective pitch angle to that of the threshold limit of governor 203. If all engines are operable, then limiter 205 produces a baseline lower limit value. If any engine is inoperable or failed, then limiter 205 increases the baseline lower limit value as the threshold limit is exceeded. When exceeded, governor 203 communicates command data of symmetric collective pitch 209 to logic 215. Limiter 205 generates 307 a limiting value/signal configured to remove the threshold limit when combined. The threshold limit is set to zero. After a period of time, limiter 205 is configured to reinstate 309 the threshold limit by phases the limit back to normal.

It is understood that alternate embodiments of flight control system 201 may or may not reinstate the threshold limit. Reinstating the threshold limit may occur after touchdown or be configured to occur during flight after all engines become operable. Furthermore, it is understood that control system 202 is configured to function automatically. Additionally, system 201 may be retrofitted upon existing aircraft through one or more updates.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A control system for an aircraft, comprising:
    a governor configured to regulate the speed of a rotor in the aircraft through collective pitch control of a rotor blade; the governor having a threshold limit relating to the maximum pitch angle of the rotor blade; and
    a limiter configured to selectively remove the threshold limit, so as to permit a pilot full command of the collective above the threshold limit;
    wherein command signals from the governor and command signals from the limiter are summed to generate a total symmetric collective pitch command for controlling the pitch of the rotor blade.

2. The control system of claim 1, wherein the limiter is configured to be selectively activated and deactivated.

3. The control system of claim 2, further comprising:
    a first engine and a second engine;
    wherein the limiter is deactivated while each engine is operational.

4. The control system of claim 3, wherein the limiter is configured to generate a baseline lower limit when deactivated.

5. The control system of claim 2, wherein the limiter is activated upon the failure of an engine and when the collective is increased above the threshold limit.

6. The control system of claim 1, wherein the command signals from the limiter are based upon the command signals from the governor, the governor configured to selectively communicate with the limiter.

7. The control system of claim 1, wherein the command signals from the limiter are configured to adjust in relation to the collective position, so as to remove the threshold of the governor.

8. The control system of claim 1, wherein the limiter is configured to remove the threshold limit for a selected time limit, the threshold limit being phased back into operation upon expiration of the time limit.

9. A rotorcraft comprising:
    a first engine and a second engine;
    a rotor and rotor blades individually operable with first engine and the second engine; and
    a flight control system configured to regulate the speed of the rotor through collective pitch control of the rotor blades, the flight control system selectively removing a threshold limit relating to the maximum pitch angle of the rotor blades, so as to permit a pilot full command of the collective during operations in which the first engine is inoperative;
    wherein the threshold limit is removed for a selected time limit, the threshold limit being phased back into operation upon expiration of the time limit.

10. The rotorcraft of claim 9, wherein the threshold limit is removed when the first engine is inoperative and the maximum pitch angle desired by the pilot exceeds the threshold limit.

11. The rotorcraft of claim 9, wherein the flight control system monitors the speed of the rotors and the operability of the first engine and the second engine.

12. The rotorcraft of claim 9, wherein the first engine is coupled to a first nacelle and the second engine is coupled to a second nacelle, the flight control system adjusts the pitch angle of the rotors as a result of a nacelle schedule as measured by a nacelle angle sensor.

13. A method of improving an arrest rate of descent at touchdown of an aircraft, comprising:
    determining the operational status of a first engine and a second engine;
    comparing a desired collective pitch angle to that of a threshold limit of a governor; and
    generating a limiting value configured to remove the threshold limit as the desired collective pitch angle exceeds the threshold limit and as the first engine is inoperative;
    wherein removal of the threshold limit provides a pilot with full command of the collective pitch angle to slow the rate of descent of the aircraft at touchdown; and
    wherein the limiting value is summed with command signals within the governor to lower the threshold limit.

14. The method of claim 13, wherein the threshold limit is removed temporarily for a period of time.

15. The method of claim 13, wherein the limiting value is dependent upon the collective pitch angle.

16. The method of claim 13, further comprising:
    reinstating the threshold limit upon when the first engine and second engine are operative.

17. The method of claim 13, wherein removal of the threshold limit is automatically performed by a flight control system.

* * * * *